US 8,977,764 B1

(12) United States Patent
Ramzan et al.

(10) Patent No.: US 8,977,764 B1
(45) Date of Patent: Mar. 10, 2015

(54) PROFILING APPLICATION USAGE FROM APPLICATION STREAMING

(75) Inventors: Zulfikar Ramzan, Cupertino, CA (US);
Sourabh Satish, Fremont, CA (US);
Brian Hernacki, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 1751 days.

(21) Appl. No.: 12/039,515

(22) Filed: Feb. 28, 2008

(51) Int. Cl.
*G06F 15/16* (2006.01)

(52) U.S. Cl.
USPC .......... 709/231; 709/232; 709/233; 709/234; 709/235

(58) Field of Classification Search
CPC ....................................... H04L 29/06
USPC ................... 709/231, 232, 234, 235
See application file for complete search history.

(56) References Cited

U.S. PATENT DOCUMENTS

| | | | |
|---|---|---|---|
| 5,765,205 A | 6/1998 | Breslau et al. | |
| 6,530,082 B1 * | 3/2003 | Del Sesto et al. | 725/9 |
| 6,757,894 B2 | 6/2004 | Eylon et al. | |
| 7,062,567 B2 * | 6/2006 | Benitez et al. | 709/231 |
| 7,197,570 B2 | 3/2007 | Eylon et al. | |
| 7,523,191 B1 * | 4/2009 | Thomas et al. | 709/224 |
| 2001/0034736 A1 | 10/2001 | Eylon et al. | |
| 2001/0037399 A1 | 11/2001 | Eylon et al. | |
| 2001/0044850 A1 | 11/2001 | Raz et al. | |
| 2002/0087717 A1 * | 7/2002 | Artzi et al. | 709/236 |
| 2002/0087963 A1 | 7/2002 | Eylon et al. | |
| 2002/0138640 A1 | 9/2002 | Raz et al. | |
| 2003/0004882 A1 * | 1/2003 | Holler et al. | 705/51 |
| 2003/0088511 A1 * | 5/2003 | Karboulonis et al. | 705/39 |
| 2003/0140160 A1 | 7/2003 | Raz et al. | |
| 2005/0182750 A1 * | 8/2005 | Krishna et al. | 707/1 |
| 2005/0188079 A1 * | 8/2005 | Motsinger et al. | 709/224 |
| 2006/0136389 A1 | 6/2006 | Cover et al. | |
| 2007/0192161 A1 * | 8/2007 | Kogan et al. | 705/10 |

OTHER PUBLICATIONS

Official Action received from USPTO dated Apr. 22, 2010 for U.S. Appl. No. 12/051,590, filed Mar. 19, 2008.

* cited by examiner

*Primary Examiner* — Derrick Ferris
*Assistant Examiner* — Abdelnabi Musa
(74) *Attorney, Agent, or Firm* — Brill Law Office; Jeffrey Brill

(57) ABSTRACT

Application usage is profiled based on application streaming. Code pages of multiple applications are streamed from a server to multiple client computers (endpoints) for execution. The streaming of the code pages is monitored, and usage data is collected such as which pages are streamed to which endpoints, under what circumstances and when. By referencing the streamed code pages and the underlying source code, the code pages are mapped (at least approximately) to corresponding application features. The collected usage data usage and the relevant mapping are analyzed, to create application usage profile data for streamed applications. The application usage profile data can include such information as how often, when, where and by whom application components are being executed, as well as which components cause errors, are most popular, confuse users, etc.

20 Claims, 2 Drawing Sheets

PROFILING APPLICATION USAGE FROM APPLICATION STREAMING

TECHNICAL FIELD

This invention pertains generally to application streaming technology, and more specifically to using application streaming to provide central application profiling.

BACKGROUND

Application streaming provides the ability for an endpoint (e.g., a client computer) to run an application locally that is stored remotely, for example on a server. The server transmits specific portions of the application (e.g., code pages) to the endpoint, as the endpoint needs them. Application streaming offers a number of advantages over running the application on the server. Streaming the application allows the application to execute locally on the endpoint, instead of remotely on the server. This eliminates the need for large farms of servers to provide applications to a plurality of client computers. Application response time to the user is also significantly faster when the application is run locally on the endpoint, as opposed to remotely on the server. Commercial application streaming technology exists today.

Software developers, quality assurance professionals and publishers have a strong interest in knowing how their software programs are actually used in the field. Data on which features of a software program are popular, which are never utilized, which confuse users, which cause the application to crash, etc., are clearly an asset in the design, implementation, testing, trouble shooting and marketing of existing and planned software programs. It is currently difficult to obtain reliable information of this nature for a wide variety of representative users.

It would be desirable to be able to glean accurate profiling data concerning application usage for a wide variety of users.

SUMMARY

Application usage is profiled based on application streaming. Code pages of multiple applications are streamed from a server to multiple client computers (endpoints) for execution. The streaming of the code pages is monitored, and usage data is collected such as which pages are streamed to which endpoints, under what circumstances and when. By referencing the streamed code pages and the underlying source code, the code pages are mapped (at least approximately) to corresponding application features. The collected usage data usage and the relevant mapping are analyzed, to create application usage profile data for streamed applications. The application usage profile data can include such information as how often, when, where and by whom application components are being executed, as well as which components cause errors, are most popular, confuse users, etc.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
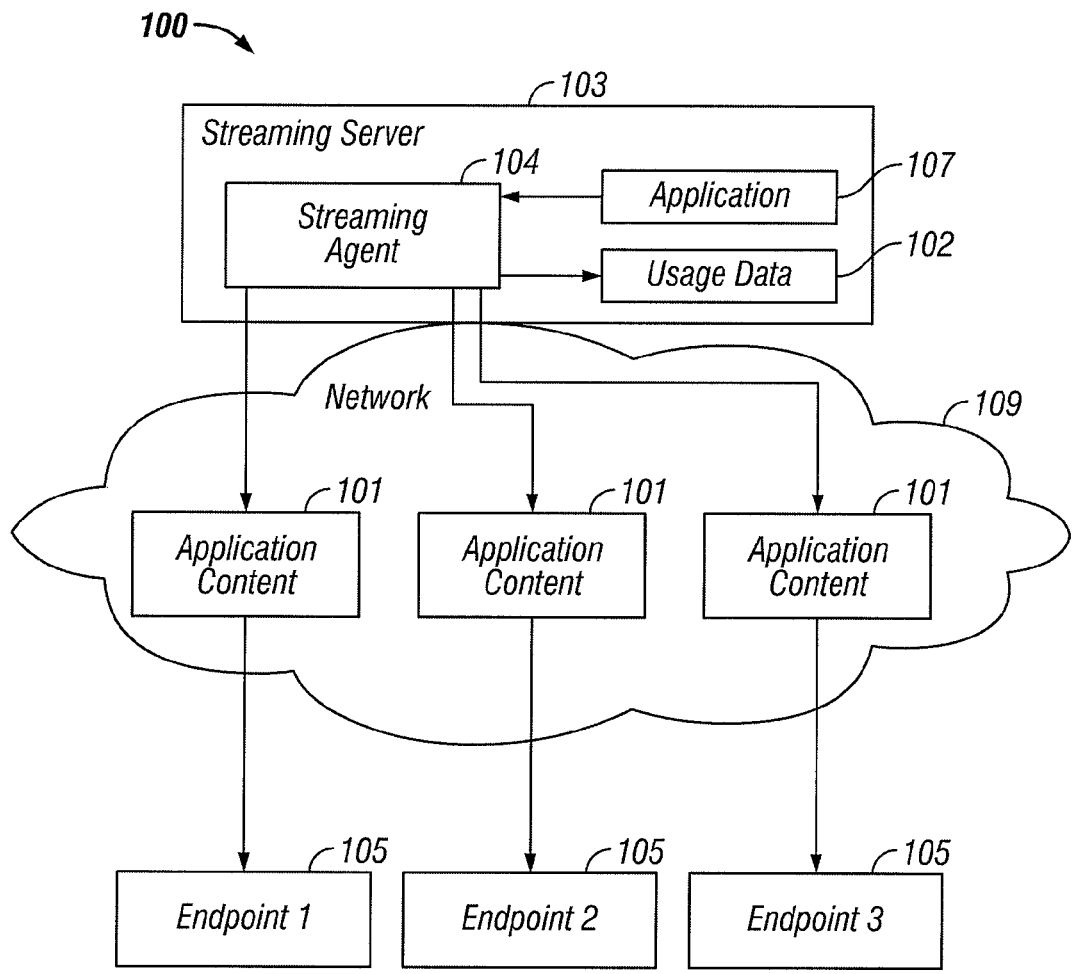
FIG. 1 is a block diagram illustrating a system for using application streaming to collect application usage data, according to some embodiments of the present invention.

FIG. 1 illustrates a system 100 for using application streaming to collect application usage data 102, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a streaming agent 104 streams application content 101 from a server 103 to a plurality of endpoints 105 over a network 109, such that the streamed applications 107 are executed on the endpoints 105. For the sake of illustration, FIG. 1 shows one only application 107 being streamed to three endpoints 105, but it is to be understood that an application streaming system 100 typically streams many applications 107 to a large plurality of endpoints 105, the endpoints 105 sometimes being very diverse geographically. Because the streaming agent 104 serves application content 101 at a code page level, there exists a great opportunity to glean usage data 102 concerning the usage of the applications 107 being streamed.

As is understood by those of ordinary skill in the relevant art, the execution of a streamed application 107 is managed to a very fine level of detail by the streaming agent 104, which provides specific code pages 101 as they are required for execution by the endpoint 105. As illustrated in FIG. 1, the streaming agent 104 monitors usage statistics 102, for example by monitoring the frequency and order of code pages 101 streamed to each endpoint 105 for each application 107, per application 107 usage instance. In a simple case, this could be implemented simply by using a set of counters per code page 101 for each usage "session" of an application 107. Of course, more complicated usage information 102 can be tracked, including not only which parts of which applications 107 are used (i.e., which code pages 101 are streamed to an endpoint 105 for execution), but also by whom (i.e., which endpoint 105) and where (i.e., where is the endpoint 105 geographically located), when, how often, for how long, etc. The implementation mechanics of gathering such usage data 102 based on streamed code pages 101 will be readily apparent to those of ordinary skill in the relevant art in light of this specification. It is to be understood that what usage data 102 to gather is a variable design parameter.

Figure 2:
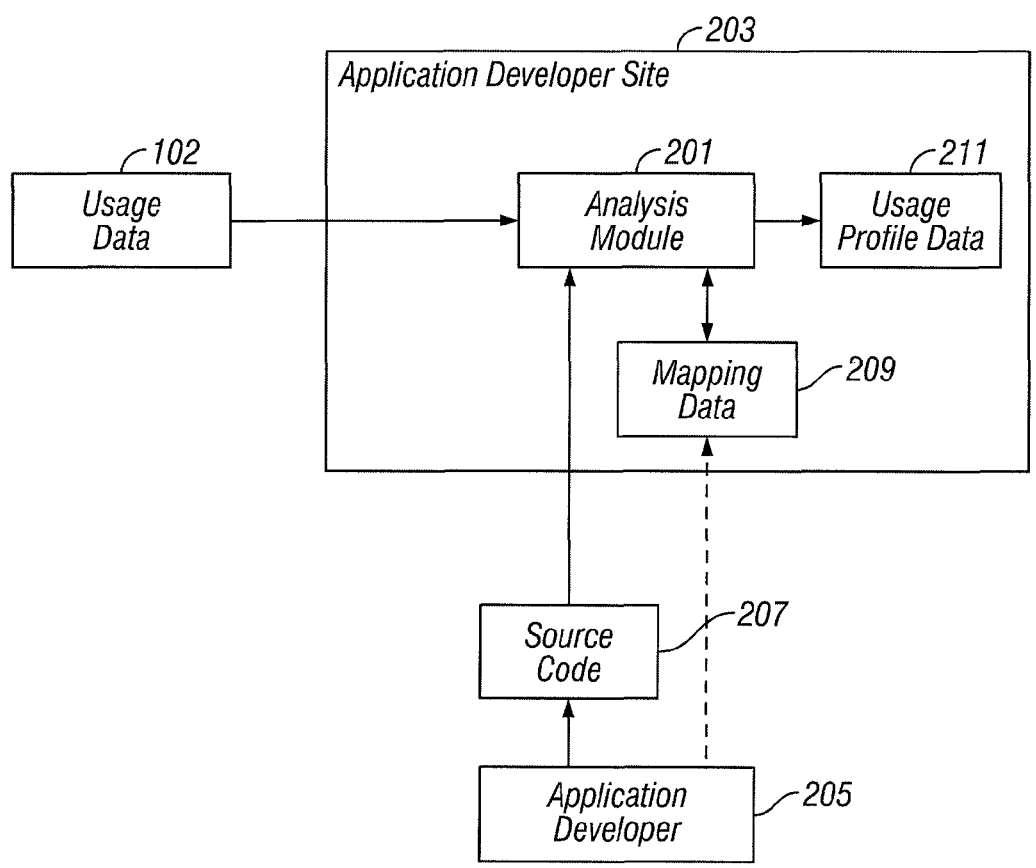
FIG. 2 is a block diagram illustrating analysis of collected application usage data, according to some embodiments of the present invention.

As illustrated in FIG. 2, as application usage data 102 is collected over time, it can be provided (still classified per distinct usage session) to an analysis module 201, for further analysis. In the embodiment illustrated in FIG. 2, the analysis module 201 runs on an application developer site 203. In other embodiments, the analysis module 201 can run at other locations (e.g., the streaming server 103) as desired. An application developer 205 or the like provides the source code 207 for the application 107 being analyzed. The analysis module 201, by referring to the corresponding source code 207, can map specific streamed code pages 101 back to specific program functionality, at least roughly. In some embodiments, some or all of this mapping data 209 is entered by, for example, the application developer 205, who has access to both the source code 207, and the usage data 102 which indicates the code pages 101 to be mapped.

It is to be understood that how much of the mapping is performed automatically by the analysis module 201, and how much is input by, e.g., an application developer 205, is a variable design parameter. The implementation mechanics of performing such mapping based on application usage data 102 and corresponding source code 207 are within the skill set of one of ordinary skill in the relevant art, and the usage thereof within the context of the present invention will be readily apparent to one of such a skill level in light of this specification.

By referring to both the mapping data 209 and the collected usage data 102, the analysis module 201 can create application usage profile data 211 by determining how different components of the application 107 are being utilized (which components, how often, when, by whom, where, etc.) Specific analysis can determine factors such as how often an application 107 terminates without passing through expected code pages 101 (e.g., exit and cleanup routines), and what code was executing at the time of termination. This indicates under which circumstances an application 107 is abnormally terminating or crashing. This information can be used, for example, to drive additional testing or evaluation of the relevant components. Analysis can also indicate conclusions such as which features of an application 107 are popular (i.e., those features corresponding to frequently streamed code pages 101), which generate error conditions (i.e., those corresponding to code pages 101 streamed prior to the streaming of error processing code 101) and which confuse users (indicated by factors such long user pauses or failure to make a selection when encountering certain menus and such.) Of course, these are only examples of the type of analysis that can be performed. Other examples will be readily apparent to those of ordinary skill in the relevant art in light of this specification. For example, usage analysis can be performed by user, by company, by geo-location, by time of day, by month, etc.

The implementation mechanics of performing such analysis based on application usage data 102 and corresponding mapping data 209 are within the skill set of one of ordinary skill in the relevant art, and the usage thereof within the context of the present invention will be readily apparent to one of such a skill level in light of this specification.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as non-transitory, magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for profiling application usage from application streaming, the method comprising the steps of:
streaming code pages of at least one application from a server to at least one endpoint, for execution of the at least one application on the at least one endpoint;
collecting data concerning specific code pages of at least one specific application streamed to at least one specific endpoint; and
utilizing collected code page data to create application usage profile data for at least one streamed application.

2. The method of claim 1 wherein collecting data concerning specific code pages of at least one specific application streamed to at least one specific endpoint further comprises:
monitoring usage statistics of streamed application code pages for each usage instance of the at least one streamed application to the at least one endpoint.

3. The method of claim 1 wherein collecting data concerning specific code pages of at least one specific application streamed to at least one specific endpoint further comprises performing at least one step from a group of steps consisting of:
monitoring frequency with which at least one code page is streamed;
monitoring order in which at least some code pages are streamed;
monitoring to which at least one endpoint at least one code page is streamed;
monitoring location of at least one endpoint to which at least one code page is streamed; and
monitoring time at which at least one code page is streamed.

4. The method of claim 1 wherein utilizing collected code page data to create application usage profile data for at least one streamed application further comprises:
utilizing application source code to map at least one streamed code page to corresponding application functionality; and analyzing collected code page data concerning mapped application functionality to create corresponding application usage profile data.

5. The method of claim 4 wherein utilizing application source code to map at least one streamed code page to corresponding application functionality further comprises performing at least one step from a group of steps consisting of:
   receiving input of at least some mapping data; and
   automatically creating at least some mapping data based on application source code and at least one streamed code page.

6. The method of claim 4 wherein analyzing collected code page data concerning mapped application functionality to create corresponding application usage profile data further comprises:
   determining how at least one component of at least one application is being utilized based on collected code page data and corresponding mapping data.

7. The method of claim 6 wherein determining how at least one component of at least one application is being utilized further comprises performing at least one step from a group of steps consisting of:
   determining how often at least one component of at least one application is being used;
   determining when at least one component of at least one application is being used;
   determining by whom at least one component of at least one application is being used;
   determining where at least one component of at least one application is being used;
   determining how often at least one component of at least one application that is terminating unexpectedly;
   determining at least one component of at least one application that is generating at least one error condition;
   determining at least one component of at least one application that is popular;
   determining at least one component of at least one application that is not popular and determining at least one component of at least one application that is confusing users.

8. At least one computer readable medium containing a non-transitory computer program product for profiling application usage from application streaming, the computer program product comprising:
   program code for streaming code pages of at least one application from a server to at least one endpoint, for execution of the at least one application on the at least one endpoint;
   program code for collecting data concerning specific code pages of at least one specific application streamed to at least one specific endpoint; and
   program code for utilizing collected code page data to create application usage profile data for at least one streamed application.

9. The computer program product of claim 8 wherein the program code for collecting data concerning specific code pages of at least one specific application streamed to at least one specific endpoint further comprises:
   program code for monitoring usage statistics of streamed application code pages for each usage instance of the at least one streamed application to the at least one endpoint.

10. The computer program product of claim 8 wherein the program code for collecting data concerning specific code pages of at least one specific application streamed to at least one specific endpoint further comprises program code for performing at least one step from a group of steps consisting of:
   monitoring frequency with which at least one code page is streamed;
   monitoring order in which at least some code pages are streamed;
   monitoring to which at least one endpoint at least one code page is streamed;
   monitoring location of at least one endpoint to which at least one code page is streamed; and
   monitoring time at which at least one code page is streamed.

11. The computer program product of claim 8 wherein the program code for utilizing collected code page data to create application usage profile data for at least one streamed application further comprises:
   program code for utilizing application source code to map at least one streamed code page to corresponding application functionality; and
   program code for analyzing collected code page data concerning mapped application functionality to create corresponding application usage profile data.

12. The computer program product of claim 11 wherein the program code for utilizing application source code to map at least one streamed code page to corresponding application functionality further comprises program code for performing at least one step from a group of steps consisting of:
   receiving input of at least some mapping data; and
   automatically creating at least some mapping data based on application source code and at least one streamed code page.

13. The computer program product of claim 11 wherein the program code for analyzing collected code page data concerning mapped application functionality to create corresponding application usage profile data further comprises:
   program code for determining how at least one component of at least one application is being utilized based on collected code page data and corresponding mapping data.

14. The computer program product of claim 13 wherein the program code for determining how at least one component of at least one application is being utilized further comprises program code for performing at least one step from a group of steps consisting of:
   determining how often at least one component of at least one application is being used;
   determining when at least one component of at least one application is being used;
   determining by whom at least one component of at least one application is being used;
   determining where at least one component of at least one application is being used;
   determining how often at least one component of at least one application that is terminating unexpectedly;
   determining at least one component of at least one application that is generating at least one error condition;
   determining at least one component of at least one application that is popular;
   determining at least one component of at least one application that is not popular and determining at least one component of at least one application that is confusing users.

15. A computer system for profiling application usage from application streaming, the computer system comprising:

streaming means for streaming code pages of at least one application from a server to at least one endpoint, for execution of the at least one application on the at least one endpoint;

collecting means for collecting data concerning specific code pages of at least one specific application streamed to at least one specific endpoint; and utilizing means for utilizing collected code page data to create application usage profile data for at least one streamed application.

16. The computer system of claim 15 wherein the collecting means for collecting data concerning specific code pages of at least one specific application streamed to at least one specific endpoint further comprise:

first monitoring means for monitoring usage statistics of streamed application code pages for each usage instance of the at least one streamed application to the at least one endpoint.

17. The computer system of claim 15 wherein the collecting means for collecting data concerning specific code pages of at least one specific application streamed to at least one specific endpoint further comprise second monitoring means for performing at least one step from a group of steps consisting of:

monitoring frequency with which at least one code page is streamed;

monitoring order in which at least some code pages are streamed;

monitoring to which at least one endpoint at least one code page is streamed;

monitoring location of at least one endpoint to which at least one code page is streamed; and monitoring time at which at least one code page is streamed.

18. The computer system of claim 15 wherein the utilizing means for utilizing collected code page data to create application usage profile data for at least one streamed application further comprise:

utilizing means for utilizing application source code to map at least one streamed code page to corresponding application functionality; and analyzing means for analyzing collected code page data concerning mapped application functionality to create corresponding application usage profile data.

19. The computer system of claim 18 wherein the analyzing means for analyzing collected data concerning mapped application functionality to create corresponding application usage profile data further comprise:

determining means for determining how at least one component of at least one application is being utilized based on collected code page data and corresponding mapping data.

20. The computer system of claim 15 wherein the means for determining how at least one component of at least one application is being utilized further comprise means for performing at least one step from a group of steps consisting of:

determining how often at least one component of at least one application is being used;

determining when at least one component of at least one application is being used;

determining by whom at least one component of at least one application is being used;

determining where at least one component of at least one application is being used;

determining how often at least one component of at least one application that is terminating unexpectedly;

determining at least one component of at least one application that is generating at least one error condition;

determining at least one component of at least one application that is popular;

determining at least one component of at least one application that is not popular and determining at least one component of at least one application that is confusing users.

* * * * *